United States Patent [19]
Garoff et al.

[11] Patent Number: 5,770,540
[45] Date of Patent: Jun. 23, 1998

[54] PROCATALYST FOR ETHYLENE POLYMER PRODUCTION, METHOD FOR ITS PREPARATION AND USE

[75] Inventors: Thomas Garoff, Helsinki; Solveig Johansson, Stenungsund; Ulf Palmqvist, Porvoo; Daniel Lindgren, Hjälteby; Marita Sutela, Porvoo; Päivi Waldvogel, Porvoo; Arja Kostiainen, Porvoo, all of Finland

[73] Assignee: Borealis Polymers Oy, Porvoo, Finland

[21] Appl. No.: 492,799

[22] Filed: Jun. 20, 1995

[51] Int. Cl.$^6$ .................................................. B01J 31/00
[52] U.S. Cl. .................. 502/154; 502/102; 502/103; 502/104; 502/113; 502/115; 502/152; 502/156; 502/157; 502/171; 502/172
[58] Field of Search ..................... 502/102, 103, 502/104, 113, 115, 152, 154, 156, 157, 171, 172

[56] References Cited

U.S. PATENT DOCUMENTS 5,045,612  9/1991  Schell, Jr. et al. .

FOREIGN PATENT DOCUMENTS 0 445 303 A1  9/1991  European Pat. Off. .
0 530 814 A1  3/1993  European Pat. Off. .
0 591 922 A1  4/1994  European Pat. Off. .

*Primary Examiner*—Elizabeth D. Wood
*Attorney, Agent, or Firm*—Birch, Stewart, Kolasch & Birch, LLP

[57] ABSTRACT

The invention relates to a procatalyst for the production of ethylene polymers, which procatalyst comprises an inorganic support, a chlorine compound carried on said support, a magnesium compound carried on said support, a titanium compound carried on said support, whereby the chlorine compound can be different from or the same as the magnesium compound and/or the titanium compound. The activity balance AB of the procatalyst in specified polymerization conditions, is $$AB > 3.2$$

wherein $AB=[(A+A'):2] \cdot [\log (MFR_2':MFR_2):(A-A')]$, A means polymerization activity expressed an kg PE/g cat ·h, $MFR_2$ means the melt flow rate in g/min units at a load of 2,16 kg, according to the standard ISO 1133, the absence of the upper index ' means low melt flow rate polymerization and the presence of the upper index ' means high melt flow polymerization. This means that the catalyst activity is relatively independent of the presence of chain transfer agents.

25 Claims, 1 Drawing Sheet

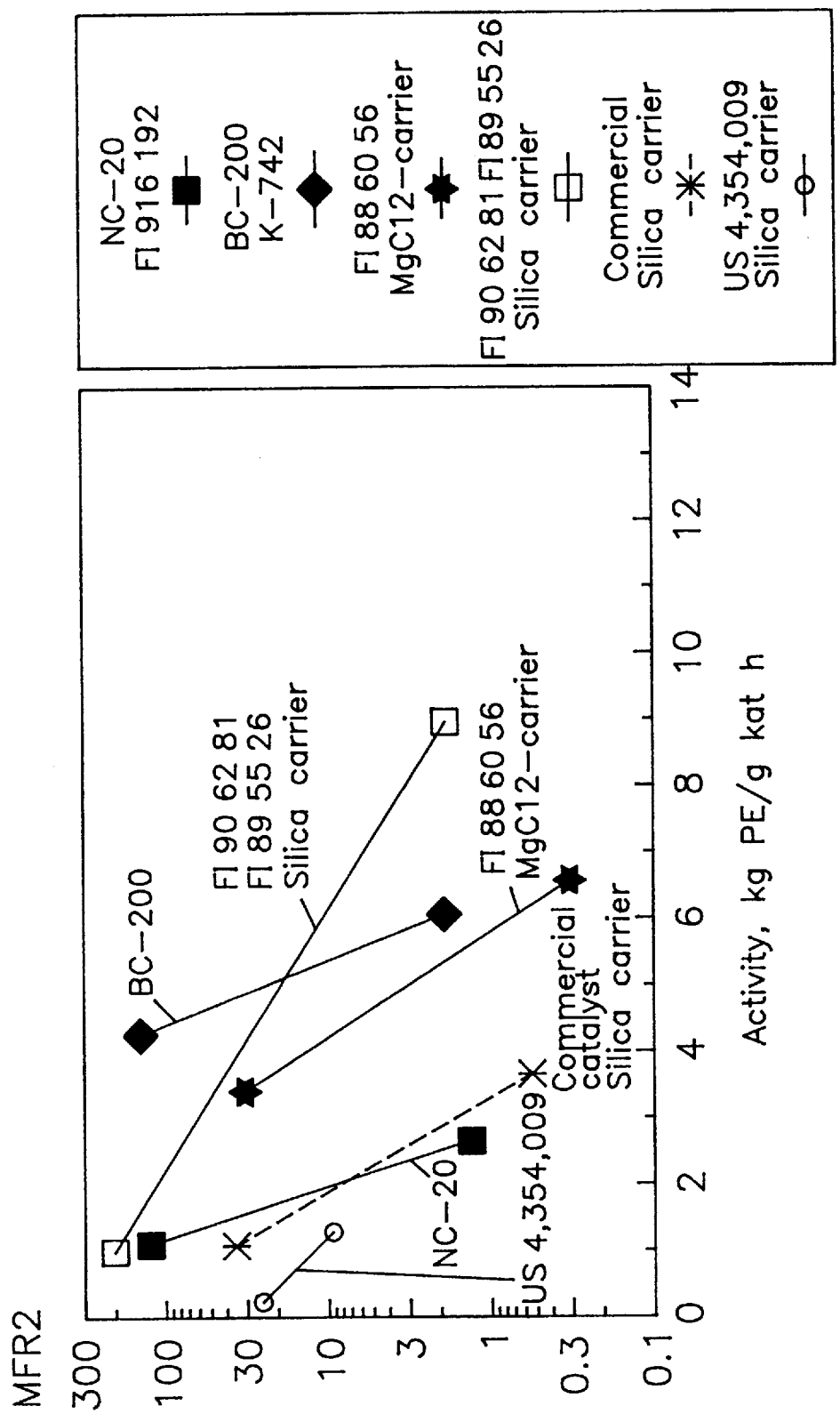

PROCATALYST FOR ETHYLENE POLYMER PRODUCTION, METHOD FOR ITS PREPARATION AND USE

DESCRIPTION

The invention relates to a procatalyst component of a Ziegler-Natta catalyst composition which is suitable for production of ethylene polymers. The composition comprises a mixture containing a group III (13) metal, chlorine, magnesium and titanium atoms, supported on a particulate inorganic carrier. The invention also relates to a preparation method and use thereof.

Ethylene, alone or with other olefinic unsaturated monomers can often be polymerized in the presence of a catalyst composition, which has essentially two components: a compound of a transition metal belonging to groups 4 to 6 of the Periodic Table of Elements (Hubbard, IUPAC 1970) which is often called a procatalyst, and a compound of a metal belonging to groups 1 to 3 of said Table which is the s.c. cocatalyst. This kind of Ziegler-Natta catalyst composition has been further developed by depositing the procatalyst on a less or more inert and particulate support and by adding to the catalyst composition in the stages of its preparation several additives, among others electron donating compounds. These compounds have improved the polymerization activity of the catalyst, the operating life and other properties of the catalyst composition and first of all properties of the polymers which are obtained by means of the catalyst composition.

when ethylene polymers and all other polymers, too, are produced the polymer molecules achieved are not similar by molecular weight, but a mixture having a narrow or broad molecular weight distribution is developed. Different average molecular weights can be defined for the polymer mixtures to describe the most common molecular weight by giving the top value of the distribution, and also several indices has been developed to describe the breadth of the distribution. For controlling the molecular weight we can add to the polymerization reaction a compound called chain transfer agent. In order to obtain polymer products having different molecular weights, a different amount of a compound for controlling the molecular weight must be fed into the polymerization reaction. The most usual and preferable chain transfer agent is hydrogen, because no foreign atoms or atom groups remain in a growing molecule, which can cause inconveniencies for the polymerization process or disadvantageous properties of the polymer produced.

How well the molecular weight of the produced polymer varies as the function of the hydrogen amount or how much the s.c. hydrogen sensibility changes, greatly depends on the catalyst composition. Generally the problem is, that in polyethylene production the polymerization activity of certain catalyst composition in production of a polymer having high molecular weight is higher, usually many times, even ten times higher, than in the production of a polymer having low molecular weight.

This absence of catalyst activity balance is a common drawback for all prior art catalysts today. The imbalance shows up when, using prior art catalysts, a drastic drop in the productivity of the catalysts occurs when going from polymerization conditions giving high molecular weight polymers (low melt flow) to polymerization conditions giving low molecular weight polymers (high melt flow). Even if this kind of a commercial catalyst can have a quite good productivity at a polymer melt flow rate (MFR, defined according to standard ISO 1133) of 1, there is often only 10% left of the productivity when producing a MFR of 500. Thus it is desirable to provide a catalyst system having a high activity which is independent from the molar mass of the forming polymer.

A novel procatalyst has now been disclosed by which ethylene homopolymers or copolymers having low or high molecular weight can be produced with an even and high activity. Despite of the amount of hydrogen introduced into the polymerization reactor, a balance of the activities in both cases can be achieved by using a procatalyst composition according to claim 1.

BRIEF DESCRIPTION OF THE DRAWING

The figure shows the relation between the obtained polyethylene melt flow rate and the polymerization catalyst activity for a commercial catalyst, several earlier catalysts of the applicant, and the claimed catalyst. The best conventional catalysts have either a high activity or low MFR sensitivity, but not these two desirable properties in combination. The claimed BC200 catalyst, on the other hand, has both high activity and low MFR sensitivity.

The unique feature of the catalyst according to the disclosure now lies in its good balance in activity in a very wide range of molar mass regulating hydrogen partial pressures used in the polymerization. It is thus possible to carry out an ethylene polymerization by the use of this novel catalyst at high and low melt flow and still have very similar high productivity. This MFR/activity balance renders the catalyst universal applicable for most types of PE resins in all polymerization processes using heterogeneous catalyst systems.

The invention aims simultaneously at maximal catalyst activity and an independence thereof from polymerization hydrogen pressure, i.e. the melt flow rate of the polymer. Thus, the activity balance AB can be defined so that $$AB \sim \frac{A'+A}{2}$$

and $$AB \sim \left| \frac{\log MFR_2' - \log MFR_2}{A'-A} \right|$$

which gives $$AB = \frac{A'+A}{2} \cdot \frac{\frac{MFR_2'}{\log MFR_2}}{A-A'}$$

wherein
AB=activity balance
A=activity in the unit kg PE/g cat. h
$MFR_2$=the polymer melt flow rate in g/min using a 2.16 kg load according to the standard ISO-1133
no upper index'=low $MFR_2$ run
upper index'=high $MFR_2$ run According to another embodiment of the invention the procatalyst comprises aninorganic support, a chlorine compound carried on said support, a magnesium compound carried on said support and a titanium compound carried on said support. It has been prepared by a process comprising the following steps a) the inorganic support is contacted with an alkyl metal chloride of the general formula $$(R_n MeCl_{3-n})_m \quad (1)$$

wherein R is a $C_1$–$C_{20}$ alkyl group, Me is a metal of group III (13) of the Periodic Table, n=1 or 2 and m=1 or 2, to give a first reaction product, b) the first reaction product is contacted with a compound or mixture containing hydrocarbyl, hydrocarbyl oxide and magnesium to give a second reaction product, c) the second reaction product is contacted with a titanium compound which contains chlorine, having the general formula $$Cl_xTi(OR^{IV})_{4-x} \quad (2)$$

wherein $R^{IV}$ is a $C_2$–$C_{20}$ hydrocarbyl group and x is 3 or 4, to give said procatalyst.

The catalyst described in this patent application thus comprises an alkyl metal chloride, which is an internal soluble chlorination agent which also has a cocatalytical impact, a soluble magnesium compound or mixture (named hereafter a magnesium complex) with a sufficiently low viscosity and a titanium compound which contains chlorine. The solubility of the soluble compounds refers to solubility in a non-polar hydrocarbon solution. The catalyst components are deposited on a suitable catalyst support. If a support material is used together with the soluble catalyst components having a sufficiently low viscosity a good morphology can be achieved to the catalyst and thereby to the polymer.

The support material must have a suitable particle size distribution, a high porosity and a large specific surface area. A good result is achieved if the support material has a specific surface area between 100 and 500 $m^2$/g support and a pore volume of 1–3 ml/g support. The support material can also be chemically pretreated, e.g. by silanation or by treatment with aluminium alkyls etc. Several metal oxides are suitable, but silicon, aluminium, titanium, chromium and zirconium oxide or mixtures thereof are preferred. Silicon dioxide or silica is most preferable.

It is good to dry the support before impregnating by other catalyst components. A good result is achieved if the support is heat-treated at 100° C. to 900° C. for a sufficient time, and thereby the surface hydroxyl groups, in the case of silica, are reduced to below 2 mmol/g $SiO_2$.

The internal cocatalyst and chlorination agent should be a metal compound containing chlorine that is soluble in non-polar hydrocarbon solvents. A good result is achieved if this compound is an alkylmetalchloride of the type (1):

$$R_nMeCl_{3-n})_m \quad (1)$$

where R is a $C_1$–$C_{20}$ alkyl group, Me is a metal from the group III (13) in the Periodic Table, preferably aluminum, k=1 or 2 and m is one or two. The alkyl group R can be linear, branched or cyclic, or mixtures thereof, preferably $C_2$–$C_{20}$ alkyl. A combination of different chlorination agents can also be used. A good result is achieved if an alkyl aluminium chloride, preferably a lower alkyl aluminium dichloride, most preferably ethyl aluminium dichloride is used.

The magnesium complex used in this catalyst synthesis should be totally soluble in a non-polar hydrocarbon solution. The Mg-complex (compound, mixture) should have the general composition of the formula $$Mg_a(OR')_bR''_cX_d \quad (3)$$

wherein X is halogen, preferably chlorine, R' is a hydrocarbon group, preferably a $C_2$–$C_{20}$ hydrocarbylgroup, that may or may not contain any hetero element, R'' is a $C_2$-$C_{20}$ hydrocarbon group and where a>1, b>0, c>0 and d≧0 and molar ratio c/b<1.

The preferable alternatives of Mg complexes can be represented by formulas (4), (5) or (6) or it can be a mixture thereof:

$$Mg(OR''')_p(R'')_{2-p} \quad (4)$$

$$Mg(OCOR''')_p(R'')_{2-p} \quad (5)$$

$$Mg(O—CH_2-O-R''')_p(R'')_{2-p} \quad (6)$$

In (4), (5) and (6) R' and R'' may be different or identical hydrocarbon groups. Preferably they are linear or branched aliphatic or aromatic groups and most preferably R' is an alkyl group and p is 1 <p<2, and most preferably 1.2<p<2.0. OCO is a carboxy group in an carboxylic acid. Essential for the composition is that p must be less than 2.

The compounds (3) to (6) are defined in the following text as the magnesium complexes. A requirement is that in all the compounds (3) to (6) there is a small amount of magnesium alkyl groups. One way to produce these magnesium complexes are to react a soluble magnesium alkyl with an alcohol. To have a good balance of hydrogen response and polymerization activity the $MgR_2$/ROH feed ratio must be larger than 1:2 and smaller than 1:1, preferably between 1:1.75 and 1:1.99, and most preferably between 1:1.80 and 1.98. This ratio does not have to be created immediately when the magnesium complex is prepared but it can also be created later on, for example after impregnation of the magnesium compound into the support by addition of sufficient amount of $MgR_2$ to reach the correct $MgR_2$/ROH feed ratio. The relation between the feed ratio and the complex composition can be obtained from the stoichiometry of the following reaction equation $$MgR''_2 + pR'''OH \rightarrow Mg(OR''')_pR''_{2-p} + pR''H$$

wherein p is the number of R'''OH moles per one mol of $MgR''_2$.

The magnesium complex is preferentially the reaction product of a di-$C_2$-$C_{20}$-alkyl magnesium, more preferentially dibutyl magnesium, butyl ethyl magnesium or butyl octyl magnesium and an alcohol. The magnesium complex is preferentially the reaction product of a dialkyl magnesium and a branched alcohol, more preferentially a 2-alkyl alkanol, most preferentially 2-ethyl hexanol or 2-propyl pentanol.

The titanium compound can be a chlorinated alcoholate i.e. $TiCl_3$*OR or a solely chloride containing compound such as $TiCl_4$. The general composition of the compound is (2):

$$Cl_xTi(OR^{IV})_{4-x} \quad (2)$$

In complex (2) $R^{IV}$ is a $C_2$–C20 hydrocarbyl group and x is 3 or 4, preferably 4. The Ti compound should be totally soluble in a non-polar hydrocarbon at the temperature applied. If pure $TiCl_4$ is used there is no need of additional hydrocarbon as this chemical is a liquid.

The alkyl metal chloride having also a cocatalytical effect, can be deposited on the support material as the first chemical in this catalyst synthesis. It is preferable, if the molar ratio between the alkyl metal chloride and the surface hydroxyls of the inorganic oxide is >1, preferably between 1 and 1.5. An even deposition is achieved if the viscosity of the agent or its solution is below 10 m*Pa*s at the temperature applied. To achieve this low viscosity the alkyl metal chloride agent can be diluted by a non-polar hydrocarbon. The best deposition is however achieved if the total volume of the deposited alkyl metal chloride solution is not exceeding the pore volume of the support, or if the excess of diluting hydrocarbon is evaporated away is after the deposition of the alkyl metal chloride. A good choice is to use a 5–25% hydrocarbon solution of ethyl aluminum dichloride. The deposition of the agent can be carried out in a wide range of temperatures, preferably between 0° C. and 110° C. The chemical addition times and the addition techniques have to be adjusted to give an even distribution of the chemical in the support material.

A good deposition of the magnesium complex solution is achieved if the volume of the magnesium complex is about two times the pore volume of the support material. This is achieved if the concentration of the complex in a hydrocarbon is between 5–60% in respect of the hydrocarbon used. The ratio between magnesium and chlorine in the alkyl metal chloride agent should be from 1:1.0 to 1:2.5. A good result is achieved if this ratio is from 1:1.5 to 1:2.0.

When depositing the magnesium complex on the support material it should have a viscosity that is lower than 10 m*Pa*s at the temperature applied. The viscosity of the magnesium complex solution can be adjusted for example by the choice of the group R' in the formulas (3) to (6), by the choice of the concentration of the hydrocarbon solution, by the choice of the ratio between the magnesium alkyl and the alcohol or by using some viscosity lowering agent.

The titanium compound can be added to the support material with or without a previous drying of the catalyst to remove the volatile hydrocarbons. The mol amount of $TiCl_4$ or corresponding titanium compound should be added to the reaction mixture in a Ti/Mg ratio that is greater than 0.1 and less than one, preferably 1:5–1:1.43. A good result is achieved if the mol ratio Ti/Mg is 0.2 to 0.7. The components should be allowed to react with each other for a sufficient amount of time at a desired temperature. Remaining hydrocarbons can if desired be removed by using slight underpressure, elevated temperature or nitrogen flash.

The procatalyst is prepared as follows: If a support is used it first is dried as previously mentioned. Then the support is treated with an alkyl metal chloride (1), preferably ethyl-Al-dichloride (EADC), which is bonded on the surface of the carrier particle by reaction with surface hydroxyl groups. Thus a carrier particle is formed on which a s. c. internal cocatalyst with chlorinating influence has been chemically bonded by forming —O—Al—$X_2$ groups. To some extent free alkyl-Al-chloride remains between the support particles.

Next Mg atoms are deposited on support particles. The most common way is to precipitate magnesium from its solution onto the particles. The most easily available Mg compounds, such as the Mg halides, particularly $MgCl_2$, do not dissolve in liquid non-polar hydrocarbons, but only in polar solvents. For instance lower aliphatic alcohols, such as methanol or ethanol can be used for the preparation of magnesium alcoholates. The thus formed Mg alcoholates do not completely mix with hydrocarbon solvents, but the mixture thereof will fractionate separate layers. Directly onto the carrier, for instance onto silica, precipitated Mg alcoholate has no polymerization activity. On the other hand, a branched alcohol, for example 2-ethyl hexanol or 2-propyl pentanol, which has a steric hindrance in the molecule close to the Mg-O bond in the Mg-alcoholate and does not coordinate easy and thereby form insoluble compounds. A solution of Mg alcoholate is formed which is completely miscible with liquid hydrocarbons. This kind of hydrocarbon solution is to be developed for the impregnation of carrier particles, so that Mg atoms will be located as even as possible on the carrier particles and also can penetrate into the particle as much as possible when the hydrocarbon is evaporated.

Mg alcholate is thus prepared from a branched aliphatic monoalcohol and a Mg dialkyl. The alcohol has a sterically bulky hydrocarbon group which prevents it from coordination tightly. In the Mg dialkyl the alkyl group has from 2 to 10 carbon atoms and can be linear or branched. Suitable examples are dibutyl-Mg (DBM), butyl ethyl-Mg (BEM), butyl octyl-Mg (BOMAG) etc. When the Mg alcoholate is prepared, the solution of monoalcohol and Mg dialkyl has a very high viscosity near the stoichiometric equivalent point, thus there are difficulties to carry out the reaction. The viscosity of the solution can be decreased by adding Ti tetraalkoxide, preferably Ti tetrabutoxide to the solution.

When carrier particles are impregnated by the Mg-alcoholate solution which contains a little Mg dialkyl (from 1 to 20 mol-%, preferably about 10 mol-%), the groups -O-Al-$X_2$ on the surface of the carrier particles are converted to groups -O-Al-(OR)R and on the surface: of the particles $MgX_2$ molecules are precipitated which both appear from the reaction between Mg compounds and the internal cocatalyst. The alkyl groups R bonded to Al atoms in the surface groups are appeared from Mg dialkyls which very easily react with the internal cocatalyst.

Finally to achieve an active procatalyst, the carrier which is treated as described above is titanized by a four valent Ti halide. A preferable Ti halide is $TiCl_4$. In the titanized procatalyst a small amount of the alkoxy and alkyl groups in the Al groups bonded to the carrier are converted to halogen groups and a small amount of $TiCl_4$ is reduced to the three valent form.

EXAMPLES

The following non-limiting examples are given to illustrate the invention and to compare it to the prior art. First it is described how Mg compound complex is prepared, then the procatalyst synthesis from this complex and other reagents is described, and finally ethylene is polymerized by means of the inventional procatalyst and in comparable examples by means of prior art procatalysts.

Preparation of Complex 1

9.5 ml toluene (0.089 mol) and 68.6 ml (0.060 mol) 20k BOMAG-A was added to a septabottle. 16.65 ml (0.1065 mol) 2-ethyl-1-hexanol was added slowly to the reactor. The temperature was kept below 40° C. The molar ratio between BOMAG-A and 2-ethyl-1-hexanol was 1:1775.

Preparation of Complex 2

6 kg toluene (65.12 mol) and 27.8 kg (33.21 mol) 19,9% BOMAG-A was added to a multipurpose reactor. The reactor was cooled down to 0° C. 789 kg (60.45 mmol/g Si) 2-ethyl-1-hexanol was added to the reactor at a speed of 10–30g/min. The temperature was kept below 20° C. The molar ratio between BOMAG-A and 2-ethyl-1-hexanol was 1:1.8 25.6 kg of this complex was transferred to a container and an aliquot was used for the catalyst prepared in example 1.

Preparation of Complex 3

To the complex left in the multi-purpose reactor in complex preparation example 2, another 0.887 kg (6.795 mol) 2 ethyl-1-hexanol was added to complex. Finally 0.34 kg (1 mmol) tetra-isobutoxy-titanium was added. The molar ratio between BOMAG-A and 2-ethyl-hexanol was 1:203. The molar ratio between Mg:Ti was 30:1.

Preparation of Complex 4

153 ml 2-ethyl-1-hexanol was added to 76.8 g of complex 3. The molar ratio between BOMAG-A and 2-ethyl-hexanol became 1:2.19.

Preparation of Complex 5

87 kg toluene was added to a reactor. Then 45.5 kg 20.3% BOMAG-A in haptane was also added in the reactor. 161 kg 99.8% 2-ethyl-1-hexanol was feeded in the reactor at the speed of 24–40 kg/h. The molar ratio between BOMAG-A and 2-ethyl-1-hexanol was 1:1.83.

Procatalyst Preparation

EXAMPLE 2

549 ml (2 mmol/g Si) of 20% EADC was added slowly to 30 g of silica (Crosfield ES70X, activated at 600° C.) at 25° C. The mixture was stirred for 20 h at 20° C. 81.0 g (2 mmol Mg/g Si) of a complex prepared according to complex preparation 2 was added and stirred for 3.5 h at 20–45° C. The catalyst was dried at 45–75° C. for two hours. The catalyst was cooled down to 46° C. and 3.33 ml (1 mmol/g Si) $TiCl_4$ diluted in 10 ml toluene was added to the precursor. The catalyst was stirred over night at 45° C. The catalyst was dried at 45–70° C. for 25 h. The composition of the dry catalyst was 26% Ti, 30% Mg, 14.3% Cl and 2.4% Al.

The Polymerization Results are Shown in Table 1.

EXAMPLE 3

275 kg silica (Grace 955) activated at 600° C. was charged into a reactor. 411 kg 20% EADC (2.0 mmol/g Si) diluted in 555 l pentane was added to the reactor at ambient temperature during 1 h. The temperature was increased to 35° C. The treated silica was stirred for 1 h. The treated silica was dried at 50° C. for 85 h. 655 kg of the complex (2 mmol Mg/g Si) prepared in complex preparation example 5 was added at 23° C. during 10 min. 86 kg pentane was added into the reactor at 22° C. during 10 min. The slurry was stirred for 8 h at 50° C. Finally 52 kg $TiCl_4$ was added during 05 h at 45° C. The slurry was stirred at 40° C. for 5 h. The catalyst was dried under nitrogen purge. The composition of the dry catalyst was 2.4% Ti, 2.3% Mg, 14.1% Cl and 29% Al.

The Polymerization Results are Shown in Table 1.

EXAMPLE 1

549 ml (2 mmol/g Si) of 20% EADC was added slowly to 30 g of silica (Crosfield ES70X, activated at 600° C.) at 25° C. The mixture was stirred for 2.5 h at 20° C. 72.1 g (2 mmol Mg/g Si) of a complex prepared according to complex preparation 1 was added and stirred for 3.5 h at 20–450° C. The catalyst was dried at 45–75° C. for two hours. The catalyst was cooled down to 46° C. and 33.3 ml (1 mmol/g Si) $TiCl_4$ diluted in 10 ml toluene was added to the precursor. The catalyst was stirred over night at 45° C. The catalyst was dried at 45–70° C. for 2.5 h. The composition of the catalyst was 32% Ti, 2.4 Mg, 16.4% Cl and 2.8% Al.

The Polymerization Results are Shown in Table 1.

EXAMPLE 4

549 ml (2 mmol/g Si) of 20% EADC was added slowly to 30 g of silica (ES70X, activated at 600° C.) at 25° C. The mixture was stirred for 2.0 h at 20° C. 76.6 g (2 mmol/g Si) of a complex prepared according to complex preparation 3 was added and stirred for 3 h at 20–45° C. The catalyst was dried at 45–70° C. for two hours. The catalyst was cooled down to 46° C. and 33.3 ml (1 mmol/g Si) $TiCl_4$ diluted in 10 ml toluene was added to the precursor. The catalyst was stirred over night at 45° C. The catalyst was dried at 45–70° C. for 20 h. The composition of the catalyst was 2.8% Ti. 20% Mg, 14.6% Cl and 2.5% Al.

The Polymerization Results are Shown in Table 1.

EXAMPLE 5

54.9 ml (2 mmol/g Si) of 20% EADC was added slowly at 25° C. to 30 g of silica (Crosfield ES70X, activated at 600° C). The mixture was stirred for 2.0 h at 20° C. 76.7 g (2 mmol Mg/g Si) of a complex prepared according to complex preparation 4 was added and stirred for 3 h at 20–45° C. The catalyst was dried at 45–70° C. for two hours. The catalyst was cooled down to 46° C. and 3.33 ml (1 mmol/f Si) $TiCl_4$ diluted in 10 ml toluene was added to the precursor. The catalyst was stirred over night at 45° C. The catalyst was dried at 45–70° C. for 20 h. The composition of the catalyst was 3.0% Ti, 2.1% Mg, 14.4% Cl and 2.7% Al.

The Polymerization Results are Shown in Table 1.

Polymerization

Ethylene was polymerized in slurry conditions giving products having different average molecular weights or melt flow ratios as follows. 1.8 litres of purified n-pentane was fed into a 3 litre reactor. The mixture was heated up to a temperature 90° C. In the meantime a 500 ml vessel was pressurized with hydrogen to 500 kPa when polymerizing at low melt flow rate conditions (LMFR) and to 1750 K when polymerizing at high melt flow rate conditions (HMFR). When the temperature 90° C was reached the pressure was about 420 kPa in the reactor. Then the procatalyst and the cocatalyst triethylaluminium (TEA) were fed into the reactor. The ethylene stream was then conducted through the bomb containing hydrogen into the reactor. The total pressure was iincreased to 1440 kPa and was maintained by means of continuous ethylene supply. The polymerization went on for one hour. The molar ratio Al/Ti was 15.

The results of the polymerizations are represented in Table 1. In FIG. 1 results are represented by diagrams where the polymerisation activity is as function of average molecular weight described as melt flow ratio (defined according to ISO 1133).

The procatalyst BC-200 was compared to the old catalysts NC-20 (FI 916192), FI 886056, FI 906281 +FI 895526, a commercial catalyst, and U.S. Pat. No. 4,354,009.

1.8l of purified isobutan was fed into a 3 l reactor. The content was heated to 95° C. Meanwhile a 500 ml vessel was pressorized with hydrogen, to 6.2 bar when the polymerization was carried out at low melt flow rate conditions (LMFR), and to 18.7 bar when the polymerization was carried out at high melt flow rate conditions. When the temperature 95° C. was reached, the procatalyst in question and a triethyl aluminum (TEA) cocatalyst were fed to the reactor. Then, ethylene was fed to the reactor through said hydrogen vessel, whereby the total pressure was raised to 28.5 bar and kept constant by feeding ethylene. The molar ratio Al/Ti was 30. The results are disclosed in table 2 and the figure. The AB index of the claimed catalyst BC-200 was clearly higher than that of the old catalysts.

TABLE 1

Polymerization results presented in examples 1–4

| Example | BOMAG: 2-EH molar ratio | MFR$_2$ g/min MFR$_2$ | MFR$_2$ g/min MFR'$_2$ | Activity (A) kg PE/g·cat·h A | Activity (A) kg PE/g·cat·h A' | k = log (MFR'$_2$: MFR$_2$) = (A – A') | $\bar{A}$ = (A + A'): 2 | AB = k · $\bar{A}$ | FRR 21/2 | BD kg/m³ | Fines >0.1 mm | APS mm |
|---|---|---|---|---|---|---|---|---|---|---|---|---|
| 1 | 1:1.775 | 1.3 | | 5.4 | | | | | 30 | 340 | 0.5 | 1.25 |
| 1' | 1:1.775 | | 114 | | 2.5 | 0.6700 | 3.95 | 2.647 | | 260 | 0.6 | 0.93 |
| 2 | 1:1.820 | 1.9 | | 3.8 | | | | | 29 | 360 | 0.4 | 1.04 |
| 2' | 1:1.820 | | 132 | | 3.3 | 3.6836 | 3.55 | 13.08 | | 280 | 1.0 | 1.07 |
| 3 | 1:1.830 | 1.9 | | 4.1 | | | | | 31 | 390 | 0.3 | 0.82 |
| 3' | 1:1.830 | | 135 | | 4.1 | ∞ | 4.10 | ∞ | | 290 | 0.3 | 0.85 |
| 4 | 1:2.02 | 1.7 | | 4.8 | | | | | 28 | 350 | 0.6 | 1.14 |
| 4' | 1:2.02 | | 140 | | 1.9 | 0.6606 | 3.35 | 2.213 | | 280 | 0.8 | 0.85 |
| 5 | 1:2.19 | 1.6 | | 4.9 | | | | | 28 | 340 | 0.7 | 1.14 |
| 5' | 1:2.19 | | 130 | | 1.7 | 0.5968 | 3.30 | 1.969 | | 290 | 2.6 | 0.74 |

BOMAG = Butyloctyl magnesium
2EH = 2-ethylhexanol
EADC = Ethyl aluminum dichloride
LMFR = Low melt flow polymerization conditions
HMFR = High melt flow polymerization conditions
MFR2 = Melt flow rate for polymer using 2,16 kg weight to ISO 1133
FRR = Flow rate ratio defined as the melt flow ratio MFR21/MFR2 ISO 1133
BD = Bulk density
APS = Average particle size
The molar ratio Al:Mg:Ti or all examples was 2:2:1

$$AB = \text{activity balance} = \frac{(A + A')}{2} \cdot \frac{\log(MFR'_2 - MFR_2)}{A - A'}$$

TABLE 2

| Sample | Activity (A) kg PE/g cat·h A | Activity (A) kg PE/g cat·h A' | MFR$_2$ g/min MFR$_2$ | MFR$_2$ g/min MFR'$_2$ | k = log/MFR'$_2$:MFR$_2$) = (A – A') | $\bar{A}$ = (A + A'):2 | AB = k · $\bar{A}$ |
|---|---|---|---|---|---|---|---|
| Invention | 6.0 | 4.2 | 2.0 | 140 | 1.03 | 5.1 | 5.25 |
| FI-906 281 + FI-895 526 | 9.0 | 1.1 | 2.0 | 200 | 0.25 | 5.1 | 1.28 |
| H-886 056 | 6.6 | 3.4 | 0.3 | 32 | 0.63 | 5.0 | 3.15 |
| Commercial | 3.7 | 1.0 | 0.4 | 40 | 0.741 | 2.4 | 1.78 |
| Neste NC20 | 2.3 | 1.2 | 1.2 | 110 | 1.784 | 1.75 | 3.12 |
| US-4 354 009 | 1.7 | 0.2 | 9.0 | 25 | 0.296 | 1.0 | 0.30 |

We claim:

1. A high activity procatalyst for the production of ethylene polymers, which procatalyst comprises an inorganic support, a chlorine compound carried on said support, a magnesium compound carried on said support, and a titanium compound carried on said support, wherein the chlorine compound is the same or different from the magnesium compound and/or the titanium compound, and wherein said procatalyst has an activity balance AB, which is greater than 3.2, wherein AB={(A+A'):2·log (MFR$_2$':MFR$_2$):(A–A')}, A represents the polymerization activity expressed as kg PE/g cat·h for a polymer of a first molecular weight, A' represents the polymerization activity for a polymer of a second molecular weight, MFR$_2$ means the melt flow rate for said polymer of a first molecular weight. MFR$_2$' means the melt flow rate for said polymer of a second molecular weight, expressed in g/min units at a load of 2.16 kg, according to the standard ISO 1133, the absence of the upper index ' means low melt flow rate polymerization and the presence of the upper index ' means high melt flow polymerization.

2. The Procatalyst according to claim 1, wherein

AB>5.

3. A procatalyst according to claim 1, wherein said procatalyst is prepared by a process which comprises:

a) contacting the inorganic support with an alkyl metal chloride which is soluble in non-polar hydrocarbon solvents and has the formula $$(R_n MeCl_{3-n})_m \tag{1}$$

wherein R is a $C_1$–$C_{20}$ alkyl group, Me is a metal group III (13) of the Periodic Table, n=1 or 2 and m=1 or 2, to give a first reaction product, b) contacting said first reaction product with a compound or mixture containing hydrocarbyl, hydrocarbyl oxide and magnesium, obtained by contacting a dialkyl magnesium and an alcohol at a molar ratio of between 1:1.78 to 1:1.99 to give a second reaction product, c) contacting said second reaction product with a titanium compound which contains chlorine, having the formula $$Cl_x Ti\, (OR^{IV})_{4-x} \tag{2}$$

wherein $R^{IV}$ is a $C_2$–$C_{20}$ hydrocarbyl group and x is 3 or 4, to give said procatalyst.

4. The procatalyst according to claim 3, wherein the compound or mixture containing hydrocarbyl, hydrocarbyl oxide and magnesium of step b) is a contact product of a di-$C_2$–$C_{10}$-alkyl magnesium and an alcohol.

5. The procatalyst according to claim 3, wherein the compound or mixture containing hydrocarbyl, hydrocarbyl oxide and magnesium of step b) is a contact product between a dialkyl magnesium and a branched alcohol.

6. The Procatalyst according to claim 3, wherein the compound or mixture containing hydrocarbyl, hydrocarbyl oxide and magnesium of step b) is contacted with the first reaction product so that the compound or mixture containing hydrocarbyl, hydrocarbyl oxide and magnesium is in a hydrocarbon solution.

7. The procatalyst according to claim 3; wherein said inorganic support is an inorganic oxide which contains surface hydroxyl groups.

8. The procatalyst according to claim 7, wherein the inorganic support is silica containing at the most 2.0 mmol of surface hydroxyl groups per g of silica.

9. The procatalyst according to claim 7 or 8, wherein the molar ratio of said alkyl metal chloride to the surface hydroxyls of the inorganic oxide is at least 1.

10. The procatalyst according to claim 3, wherein said alkyl metal chloride is an alkyl aluminum chloride.

11. The procatalyst according to claim 3, wherein said alkyl metal chloride is in the form of a 5–25% hydrocarbon solution.

12. The procatalyst according to claim 3, wherein the atomic ratio between said magnesium and the chlorine of said alkyl metal chloride is from 1:1.0 to 1:2.5.

13. The procatalyst according to claim 3, wherein the titanium compound of step c) is titanium tetrachloride.

14. The procatalyst according to claim 3, wherein the ratio between the titanium compound of step c) and the compound or mixture containing hydrocarbyl, hydrocarbyl oxide and magnesium of step b) is such that the atomic ratio between titanium and magnesium is $0.1 \leq Ti/Mg \leq 1$.

15. The procatalyst according to claim 1, wherein X is chlorine.

16. The procatalyst according to claim 4, wherein said di-$C_2$–$C_{10}$-alkyl magnesium is a member selected from the group consisting of dibutyl magnesium, butyl ethyl magnesium and butyl octyl magnesium.

17. The procatalyst according to claim 5, wherein said branched alcohol is a 2-alkyl alkanol.

18. The procatalyst according to claim 17, wherein said 2-alkyl alcohol is 2-ethyl hexanol or 2-propyl pentanol.

19. The procatalyst according to claim 3, wherein said molar ratio is between 1:1.80 and 1:1.98.

20. The procatalyst according to claim 6 or 11, wherein the viscosity of said hydrocarbon solution is below 10 mPas.

21. The procatalyst according to claim 9, wherein said molar ratio is between 1 and 1.5.

22. The procatalyst according to claim 10, wherein said alkyl aluminum chloride is a lower alkyl aluminum dichloride.

23. The procatalyst according to claim 22, wherein said lower alkyl aluminum dichloride is ethyl aluminum dichloride.

24. The procatalyst according to claim 12, wherein said atomic ratio is between 1:1.5 and 1:2.0.

25. The procatalyst according to claim 14, wherein said atomic ratio is between 0.1 and 0.7.

* * * * *